(12) United States Patent
Avenatti et al.

(10) Patent No.: US 11,465,484 B2
(45) Date of Patent: Oct. 11, 2022

(54) HYPER-COMPACT ELECTRIC ALL-TERRAIN VEHICLE DRIVETRAIN AND CONVERSION KIT

(71) Applicant: The United States of America, as represented by the Secretary of the Navy, Crane, IN (US)

(72) Inventors: Peter Matthew Avenatti, Bloomington, IN (US); Tyler Allen Mullis, Bloomfield, IN (US); Braden Matthew Yake, Bloomington, IN (US); Jason Everett Miller, Jasonville, IN (US); Ryan Wynne, Olympia Fields, IL (US); Lucas Allison, Madison, AL (US); Joseph Patrick Bailey, Bloomington, IN (US); Al Bodey, Carmel, IN (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/402,945

(22) Filed: Aug. 16, 2021

(65) Prior Publication Data

US 2022/0055470 A1 Feb. 24, 2022

Related U.S. Application Data

(63) Continuation of application No. 16/280,843, filed on Feb. 20, 2019, now Pat. No. 11,124,057.

(Continued)

(51) Int. Cl.
*B60W 20/10* (2016.01)
*B60K 6/40* (2007.10)
(Continued)

(52) U.S. Cl.
CPC .................. *B60K 6/40* (2013.01); *B60K 1/02* (2013.01); *B60K 6/52* (2013.01); *B60L 50/16* (2019.02);
(Continued)

(58) Field of Classification Search
CPC ... B60K 6/40; B60K 1/02; B60K 6/52; B60K 6/46; B60K 2001/001; B60K 2001/0438;
(Continued)

(56) References Cited

U.S. PATENT DOCUMENTS

4,621,335 A * 11/1986 Bluish .................... G01D 9/005
340/945
2019/0118655 A1 * 4/2019 Grimes ................. B60W 20/13
(Continued)

*Primary Examiner* — Justin Holmes
(74) *Attorney, Agent, or Firm* — Naval Surface Warfare Center, Crane Division (57) ABSTRACT

The present invention relates to electric drivetrain kits for converting all-terrain vehicles into hybrid or electric vehicles. In exemplary embodiments, a conversion kit replaces an existing standard single motor and transmission drive system with a dual set-up including a motor for each rear wheel and a split transmission that houses two sets of gear reduction components in a single housing or an all-wheel configuration with two transmission sets (front and rear). Dual output shafts in each transmission set drive the wheels independently to provide the torque needed as required and demanded by each wheel. System electronics send signals to the motors and other components to manage the system and independently control each wheel.

7 Claims, 13 Drawing Sheets

Related U.S. Application Data

(60) Provisional application No. 62/632,550, filed on Feb. 20, 2018.

(51) Int. Cl.
*B60K 1/02* (2006.01)
*B60K 6/52* (2007.10)
*B60S 11/00* (2006.01)
*B60L 50/16* (2019.01)

(52) U.S. Cl.
CPC .............. *B60S 11/00* (2013.01); *B60W 20/10* (2013.01); *B60L 2200/46* (2013.01)

(58) Field of Classification Search
CPC .... B60K 2007/0046; B60K 2007/0061; B60K 1/00; B60K 1/04; B60K 7/0007; B60L 50/16; B60L 2200/46; B60L 50/66; B60L 50/75; B60L 2220/42; B60S 11/00; B60W 20/10; B60Y 2200/46; B60Y 2304/076; B60Y 2400/202; B60Y 2200/20; Y02T 10/62; Y02T 10/64; Y02T 10/70; Y02T 90/40
See application file for complete search history.

(56) References Cited

U.S. PATENT DOCUMENTS

2019/0337391 A1\* 11/2019 Crombez .............. B60W 30/02
2022/0123570 A1\* 4/2022 Fuchs ..................... B60L 58/12

\* cited by examiner

HYPER-COMPACT ELECTRIC ALL-TERRAIN VEHICLE DRIVETRAIN AND CONVERSION KIT

CROSS-REFERENCE TO RELATED APPLICATIONS

The present application is a continuation to U.S. patent application Ser. No. 16/280,843, filed Feb. 20, 2019 entitled "Hyper-Compact Electric All-Terrain Vehicle Drivetrain and Conversion Kit," which claims priority to U.S. Provisional Patent Application Ser. No. 62/632,550, filed Feb. 20, 2018, entitled "Hyper-Compact Electric All-Terrain Vehicle Drivetrain and Conversion Kit," the disclosures of which is expressly incorporated by reference herein.

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon. This invention (Navy Case 200456US03) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE INVENTION

The present invention relates to electric drivetrain kits for converting all-terrain vehicles into hybrid or electric vehicles.

BACKGROUND AND SUMMARY OF THE INVENTION

The present invention relates to electric drivetrain kits for converting all-terrain vehicles into hybrid or electric vehicles. Previous all-terrain vehicles (ATVs) are limited by space constraints within the chassis of the ATV.

Embodiments of the invention relate to a silent all-terrain vehicle (ATV) drive system which allows for more efficient power transfer and steady torque by reducing the "fight" between the wheels speed and any slippage that occurs. The system is quieter and cooler making thermal and audio detection less likely and improves working conditions for the driver. Regenerative breaking capability reduces wear on braking components. Gear ratios are adjustable to allow for customization based on terrain and conditions and gears can be changed relatively easily. The system also allows for potential zero-radius turning and is submersible.

According to an illustrative embodiment of the present disclosure, a conversion kit replaces an existing standard single motor and transmission drive system with a dual set-up including a motor for each rear wheel and a split transmission that houses two sets of gear reduction components in a single housing or an all-wheel configuration with two transmission sets (front and rear). Dual output shafts drive the wheels independently. The transmission housing can be opened and gears replaced via pull and drop. Exemplary embodiments utilize self-contained microcontrollers that read standard vehicle digital messages and provides standard digital messages back to the vehicle's electronic control unit so that the stock vehicle electronic control, display and functionality can be maintained.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
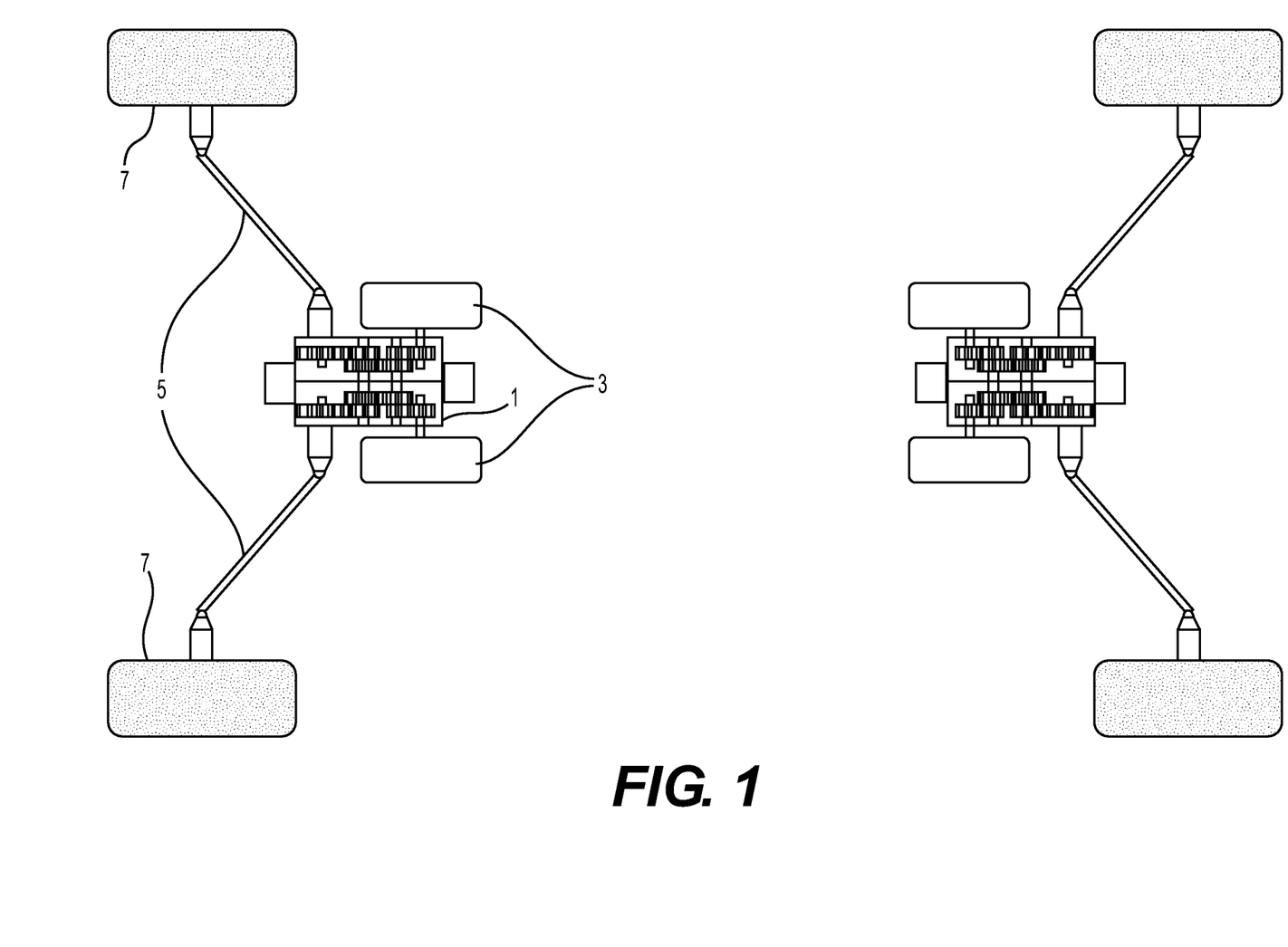
FIG. 1 shows an exemplary power train architecture.

FIG. 1 shows an exemplary power train architecture. A compact, independent transmission 1 can be coupled to one to two traction motors 3 and to axles 5. In embodiments with two traction motors 3 coupled to each transmission 1, each traction motor 3 powers a corresponding wheel 7. In embodiments with one traction motor 3 coupled to each transmission 1, each traction motor 3 powers two corresponding wheels (e.g., a pair of front or rear wheels). Each motor 3 has a motor controller which adjusts the output of its motor.

Figure 2:
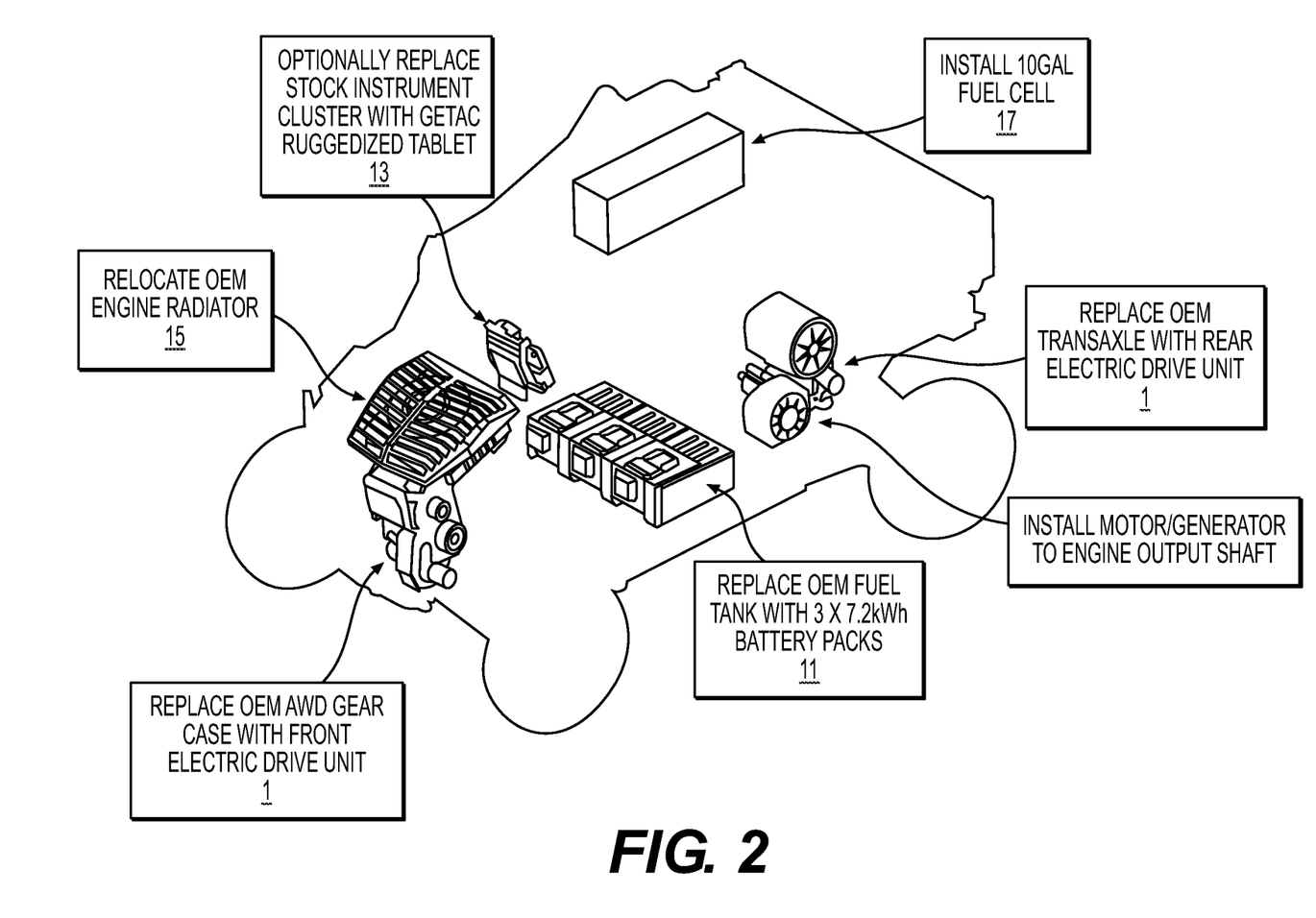
FIG. 2 shows an exemplary ATV with conversion kit components installed.

FIG. 2 shows an exemplary ATV with conversion kit components installed. A conversion kit can include two transmissions 1 and at least one battery pack 11 to act as a power source, and an Electronic Control Unit (ECU) 13. A fuel cell 17 can be installed as an additional power source. An engine radiator 15 can be removed or relocated depending on the configuration of the motors. For example, if a gasoline engine is used as one of the motors, radiator 15 can be relocated to a position to provide optimal cooling to that engine. ECU 13 can be a ruggedized tablet mounted on or near the dashboard or steering column to provide a driver or passenger access to electronic controls. Each of the motor controllers, batteries and subsystems are electrically coupled to an ECU 13 (see FIG. 5B) via CANBUS and digital inputs/outputs. Individual motor controllers allow the wheels to move independently and provide the torque needed as required and demanded by each.

Figure 3:
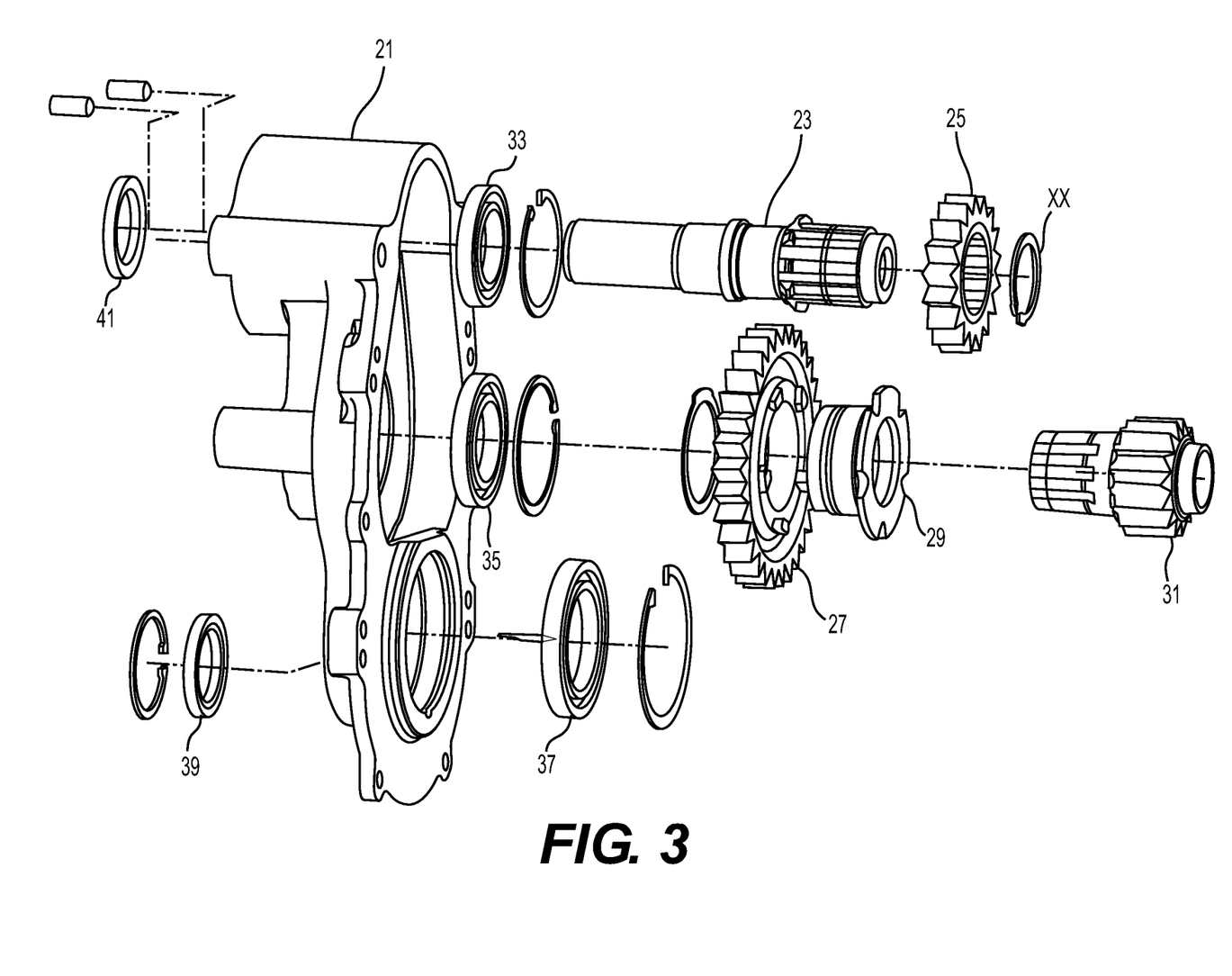
FIG. 3 shows a first portion of an exemplary transmission.

FIG. 3 shows a first portion of an exemplary transmission. A first outboard cover 21 covers the components. An input shaft 23 connects a motor to a first pinion 25. A shaft coupler 29 connects a first gear 27 to a second pinion 31. A first, second, and third bearing 33, 35, 37 permit rotation in one direction. A plurality of seals including seals 39, 41 are used to facilitate coupling of the other components. A third portion of an exemplary transmission can be a mirrored first portion such that the first, second (see FIG. 4), and third portions form a symmetrical transmission.

Figure 4:
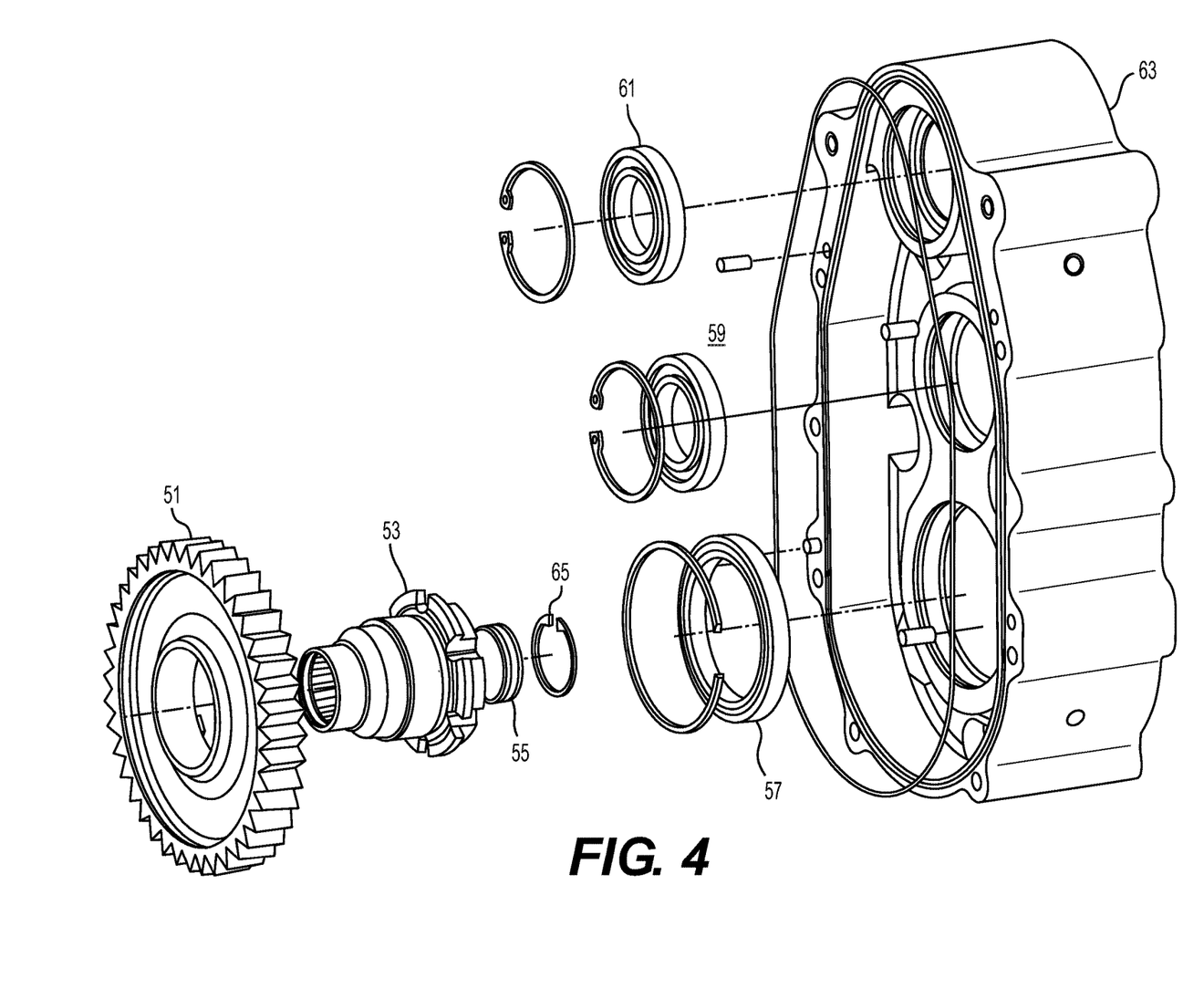
FIG. 4 shows a second portion of an exemplary transmission.

FIG. 4 shows a second portion of an exemplary transmission. An output shaft 53 couples to a second gear 51 and shaft plug 55. A fourth, fifth, and sixth bearing 57, 59, 61 permit rotation in one direction. A first pinion (see FIG. 3) couples to sixth bearing 61. A second pinion (see FIG. 3) couples to fifth bearing 59. Second gear 51 couples to third bearing (see FIG. 3). A plurality of seals including seals are used to facilitate coupling of the other components. A retain ring 65 holds shaft plug 55 in place. The common center housing 63 is symmetrical with matching pairs of components (e.g., 51, 53, 55, 57, 59, 61) such that the first (see FIG. 3), second, and third portions (see FIG. 3) form a symmetrical transmission. The gears and pinions in FIGS. 3 and 4 can be swapped out between use to adjust the gear ratios to change the performance of the vehicle (e.g., using smaller output gears on rough terrain).

Figure 5A:
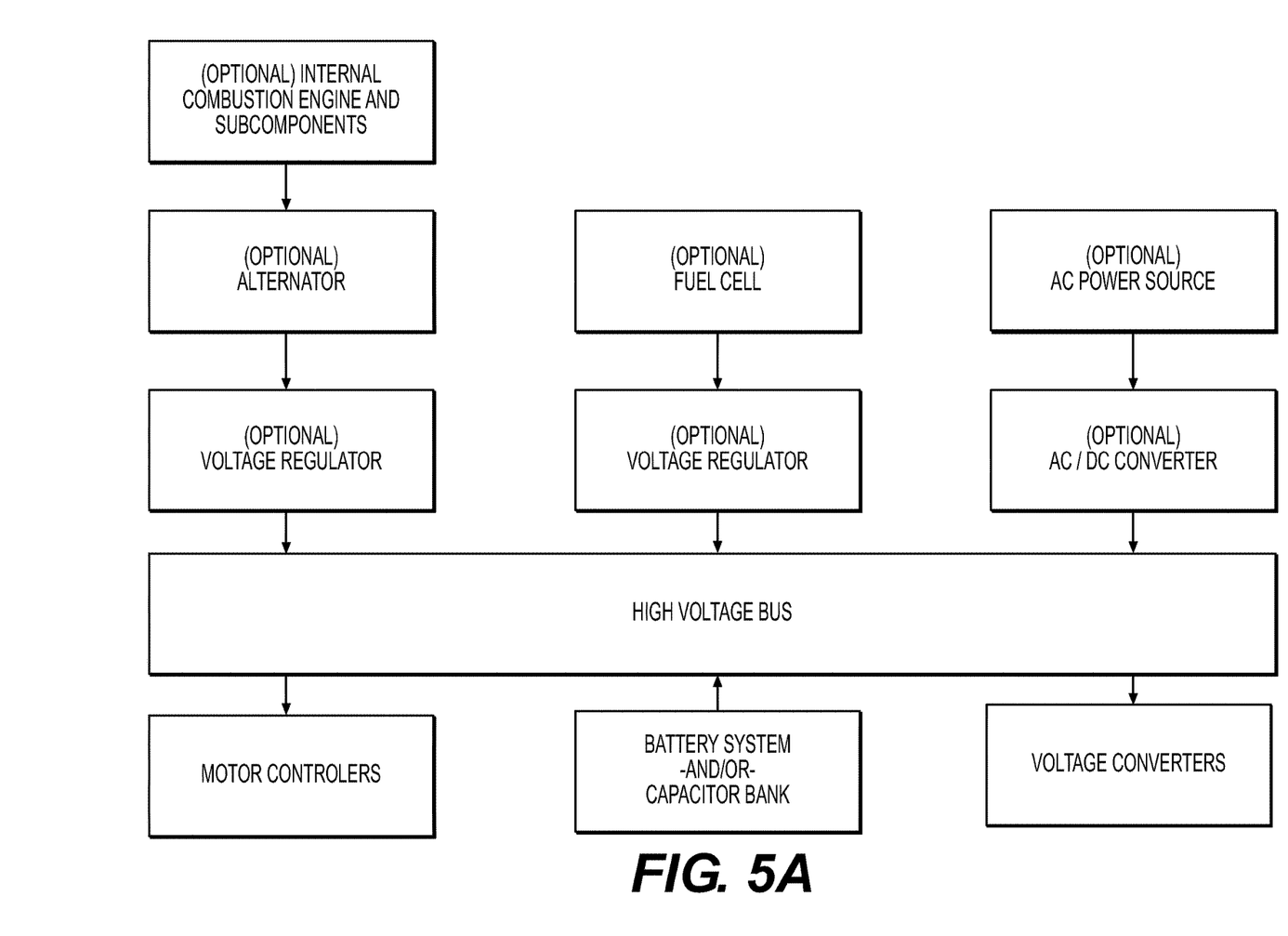
FIGS. 5A and 5B show an exemplary vehicle power architecture.
Figure 5B:
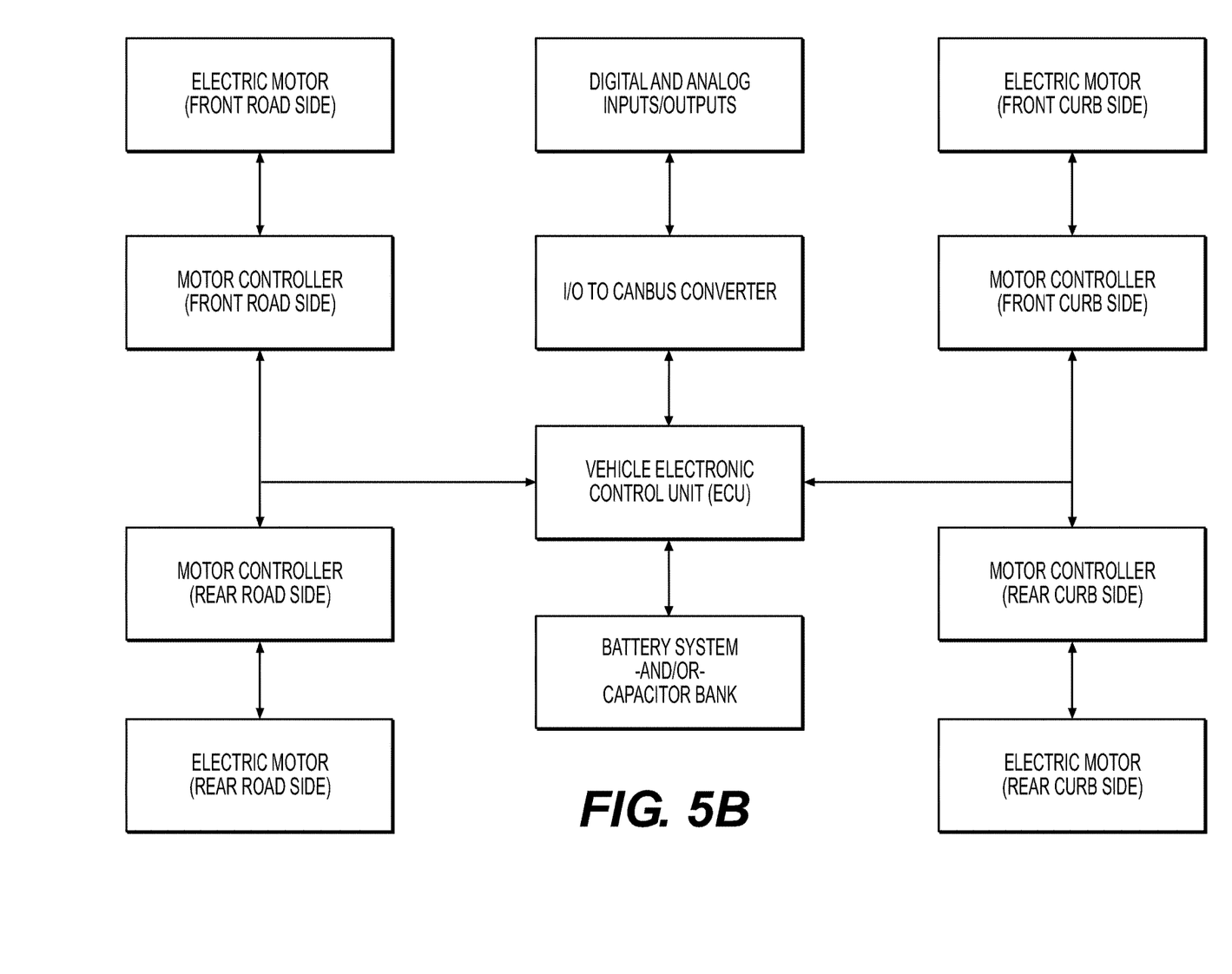

FIGS. 5A and 5B show an exemplary vehicle power architecture. FIG. 5A shows electrical components present in hybrid and pure electric embodiments as well as combustion components present only in hybrid embodiments. In FIG. 5B, the ECU comprises an interface card which contains the connectors to tie the board to the system and transceivers to convert serial and CANBUS signals, a breakout board/card that allows a commercial development board to connect to the ECU, an I/O card that includes filters and I/O expanders to allow for the appropriate amount of I/O and protection from electronic noise, and a power card that converts vehicle voltages to appropriate voltages needed by the ECU. By using a separate motor and motor controller for each wheel assembly, exemplary embodiments are capable of exercising improved control and turning capabilities by individually adjusting the power to each motor. Exemplary embodiments are capable of "zero-turns," wherein the vehicle is capable of rotating about an approximate center with minimal movement of the approximate center's position.

Figure 6A:
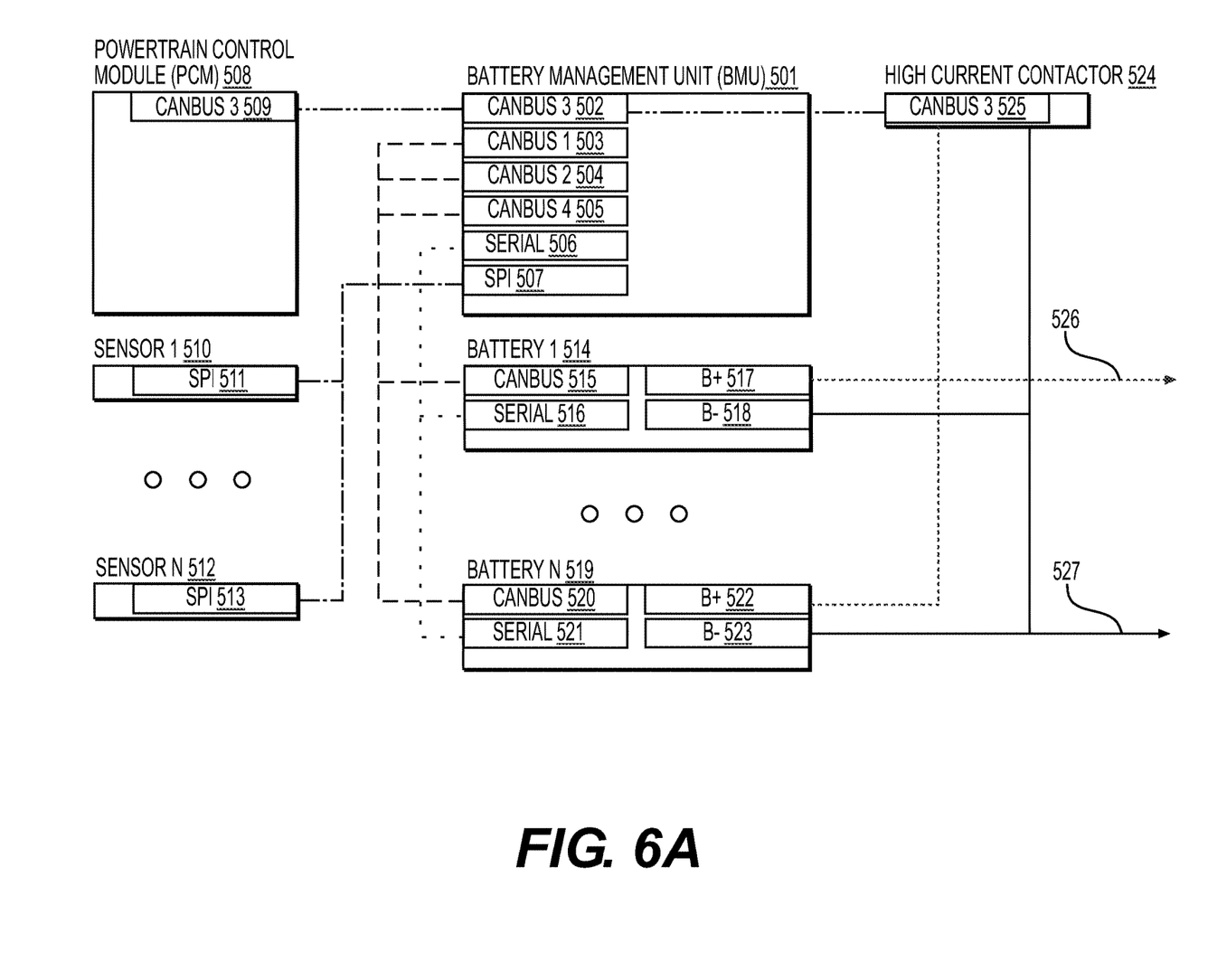
FIGS. 6A and 6B show block diagrams of the signal connections to the PCM and BMU.

FIG. 6A is a block diagram of the signal connections to the Battery Management Unit (BMU) 501. CANBUS communication by the BMU 501 is primarily used for two functions: (1$^{st}$) information reporting between the BMU transceiver 502 and the Powertrain Control Module (PCM) 508 transceiver 509, (2$^{nd}$) and the monitoring of the batteries 514/519 CANBUS data from their respective transceivers 515/520. CANBUS traffic between the BMU 501 and PCM 508 consist of some of the following data: allowable current draw from the batteries, allowable charge current to the batteries, battery system State of Charge (SOC), battery system voltage, battery temperature, battery system status codes, and control signals from the PCM 508. Additional CANBUS signals can allow additional contactors 524 to open and close to allow for external electrical power connections. Additionally FIG. 5 illustrates serial communication between the BMU serial transceivers 506/507 and sensors 510/512 and batteries 514/519. These serial signals can allow monitoring of battery system conditions such as, but not limited to temperature and chassis isolation. If the system is in an acceptable state and propulsion, battery charging or external power is desired, the BMU 501 will allow the battery internal contactors to close and allow the B+ 517/522 and B− 518/523 to be connected to their respective busses 526/527.

Figure 6B:
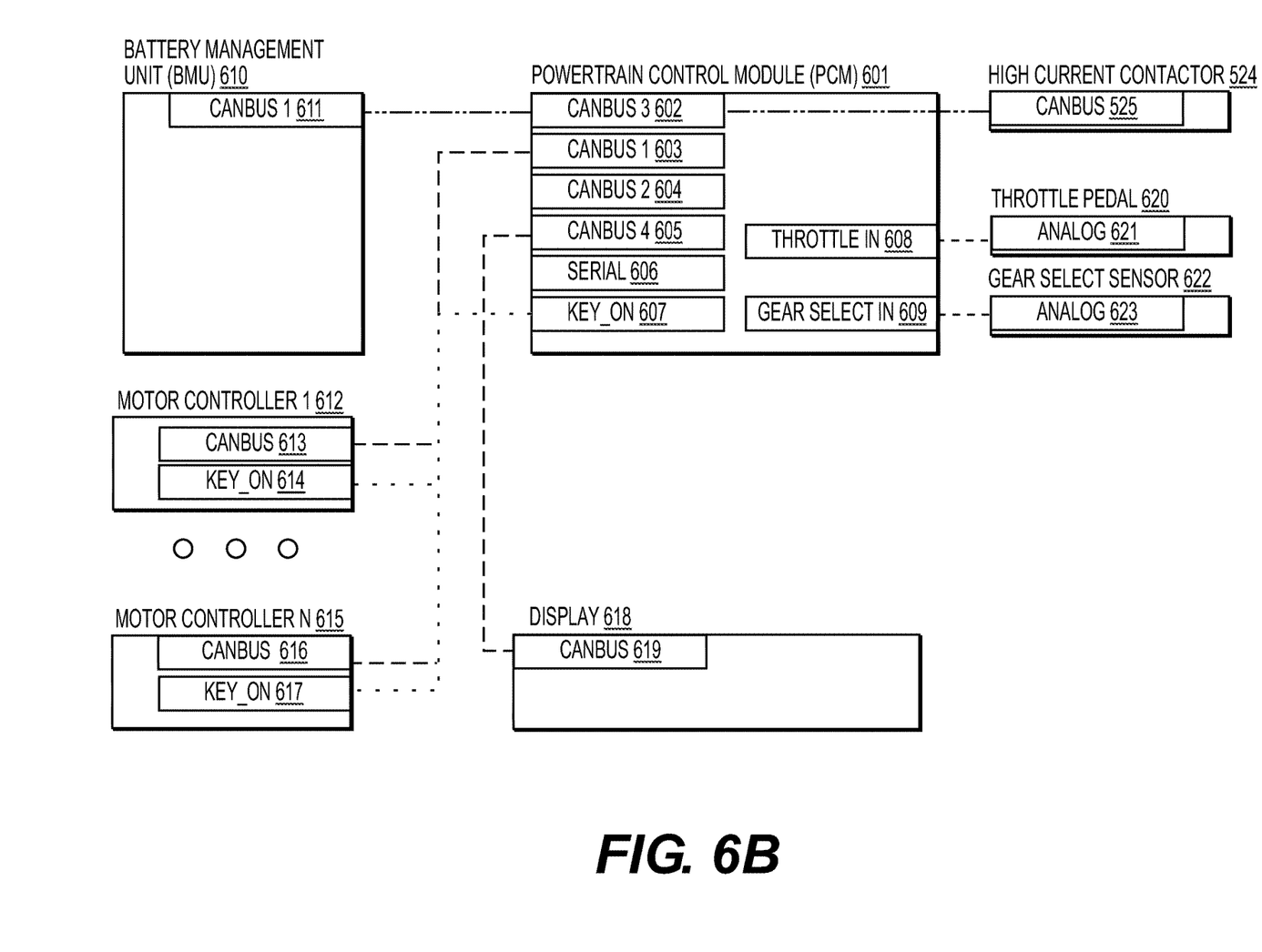

FIG. 6B is a block diagram of the signal connections to the Powertrain Control Module 601. CANBUS communication by the PCM 601 is used to monitor vehicle subsystems associated with the Diesel Electric Conversion Kit (DECK) and communicate with the existing vehicle 624 CANBUS 625. The PCM 601 can be integrated with existing vehicle systems CANBUS architecture without the need of a message translator. The PCM 601 contains the DECK control and monitoring code and allows for operator inputs such as Throttle 620, Gear Selection 622 directly into the PCM's analog inputs 608/609 respectively or via the existing vehicle 624 CANBUS 625 to obtain these inputs. Monitoring is performed over CANBUS connections to the BMU 610 and Motor Controllers 612/615 to provide the PCM with system data to determine the amount of current available and the distribution of current to each motor controller. Traction control is achieved via PCM algorithms and current distribution to each of the motor controllers based on required torque at each wheel to achieve desired propulsion from the steering and throttle inputs read over vehicle CANBUS 625 and/or analog inputs 608. System information and optional user inputs can be provided over the CANBUS link between the PCM 601 and the display 618. The display can provide information such as the battery state of charge, drive mode, speed, vehicle range based on PCM calculations from the data provided from the BMU 610 and the vehicle 624. The BMU and PCM can also be used in place of a vehicle ECU to control all digital signals required of the vehicle platform.

Figure 7:
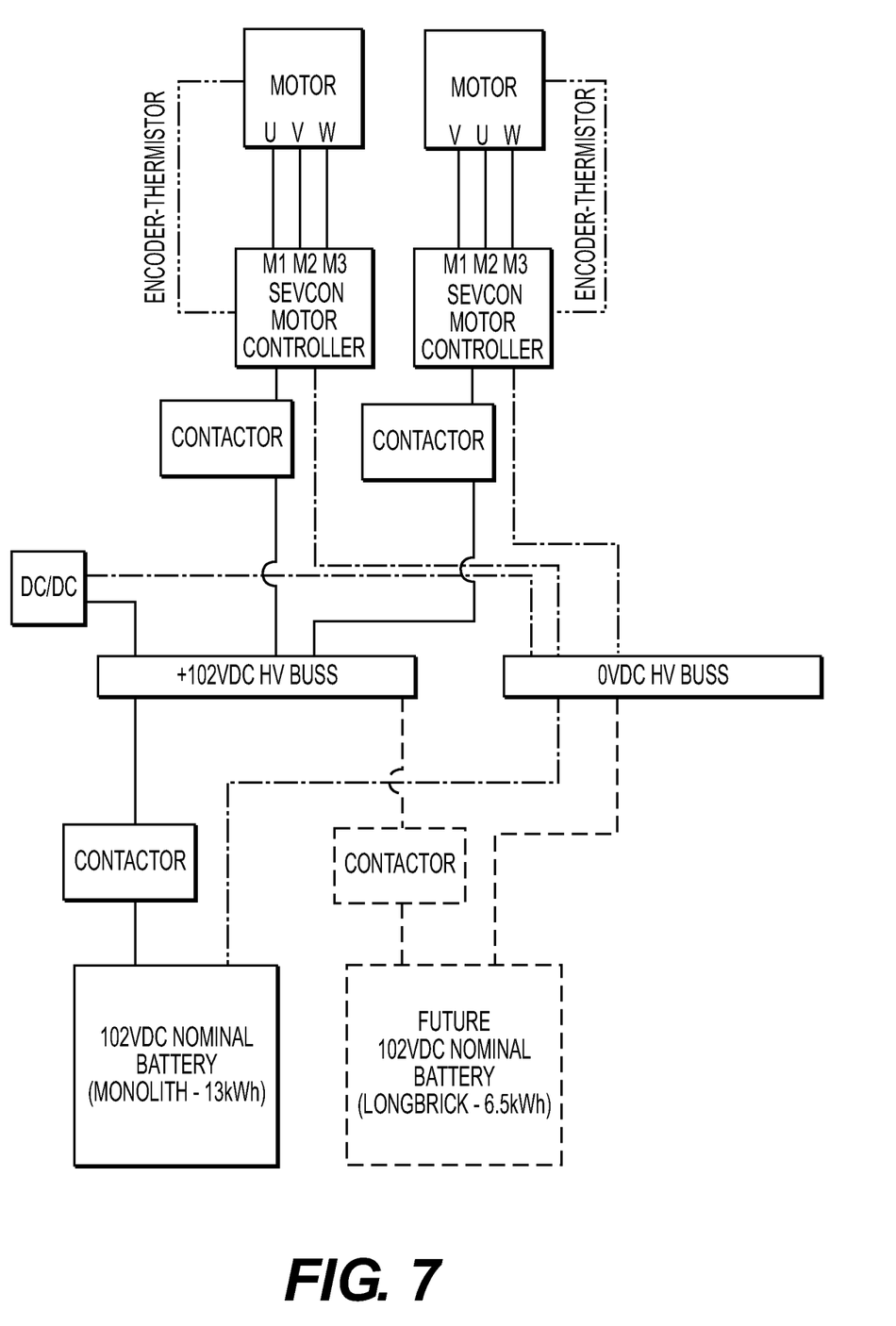
FIG. 7 shows a block diagram of an exemplary mobility platform power architecture.

FIG. 7 shows a block diagram of an exemplary mobility platform power architecture.

Figure 8:
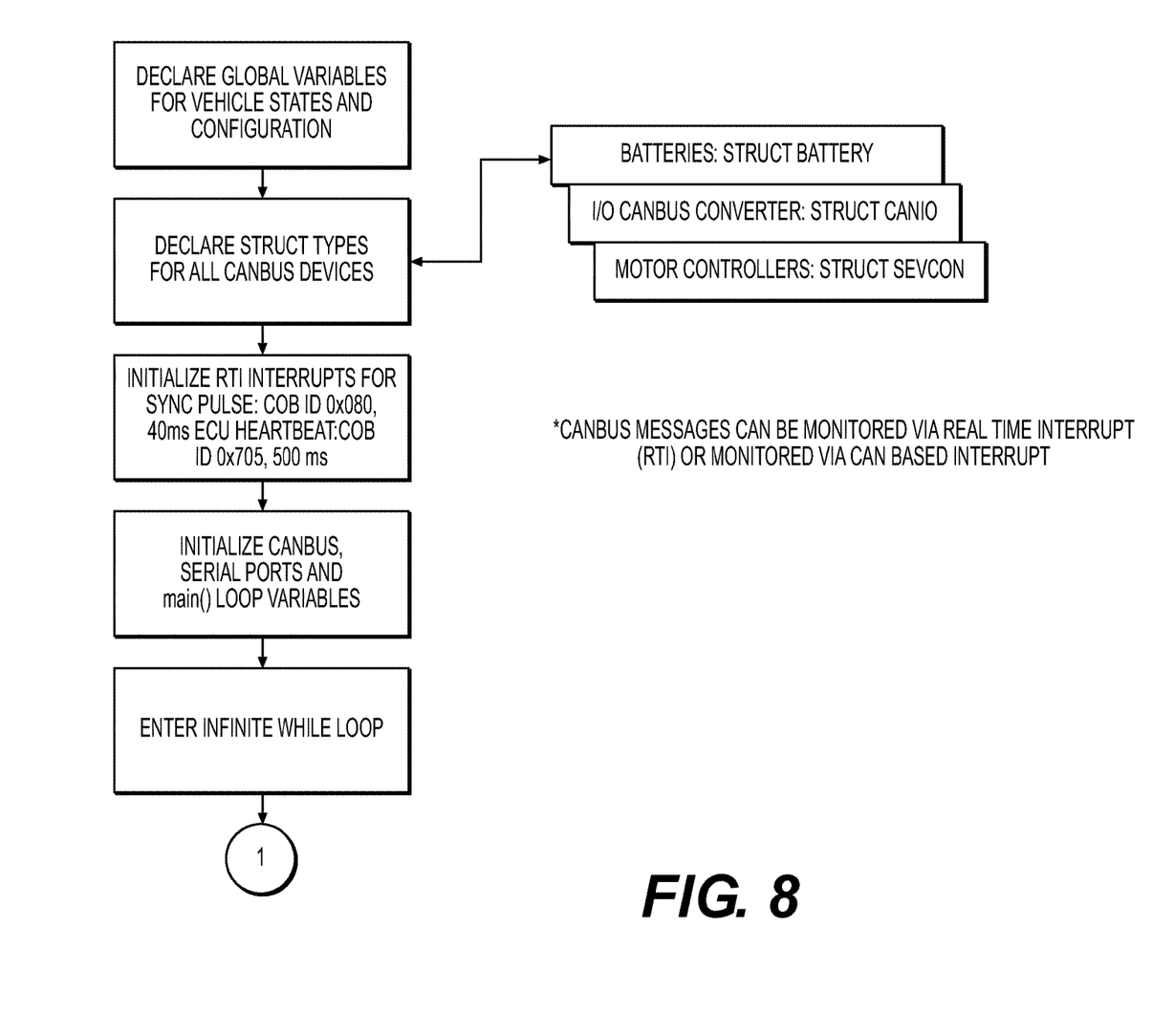
FIG. 8 shows an exemplary initialization process for the PCM and BMU.

FIG. 8 shows an exemplary initialization process for the PCM and BMU. Declarations 901 are made for global variables and vehicle states to assign the current vehicle configuration. The embedded C code utilizes structs which are declared 902 for all CANBUS devices to include, but not limited to Batteries 907, I/O Devices 908, Motor Controllers 909, etc. The Real Time Interrupts (RTIs) are initialized 903 to start Sync Pulses and both PCM and BMU heartbeats which indicate they are in a RUN state of operation. Then the CANBUS, Serial Ports and main( ) program loops are initialized 904. Once 904 is complete the embedded applications enter their infinite WHILE loops 905.

Figure 9:
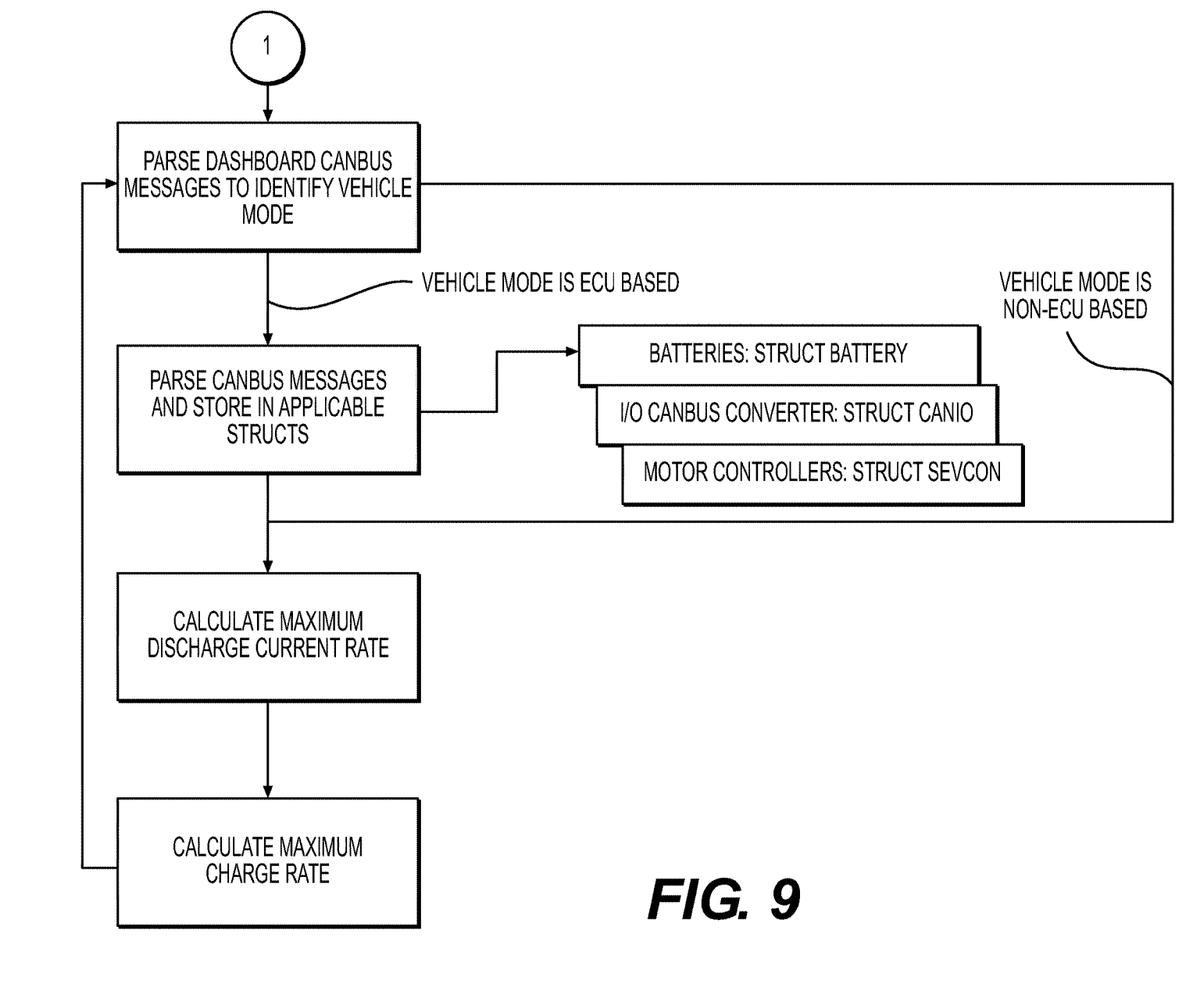
FIG. 9 shows an exemplary flow diagram of communication between the PCM and BMU.

FIG. 9 shows an exemplary flow diagram of communication between the PCM and BMU when inside their Main( ) loops. The functions associated with the parsing user inputs 1002, determine vehicle mode of operation and desired propulsion. If the vehicle is utilizing its onboard PCM, additional messages generated from user inputs are parsed and stored in the appropriate variables such as battery data 1006, I/O data 1007, and motor controller signals 1008. When the real time data has been stored, computations can be made to determine maximum discharge current rate 1004 and maximum charge rate 1005. These calculations 1004 and 1005 are used with the I/O data 1007 and Motor Controller data 1008 to determine allowed and desired operation.

Figure 10:
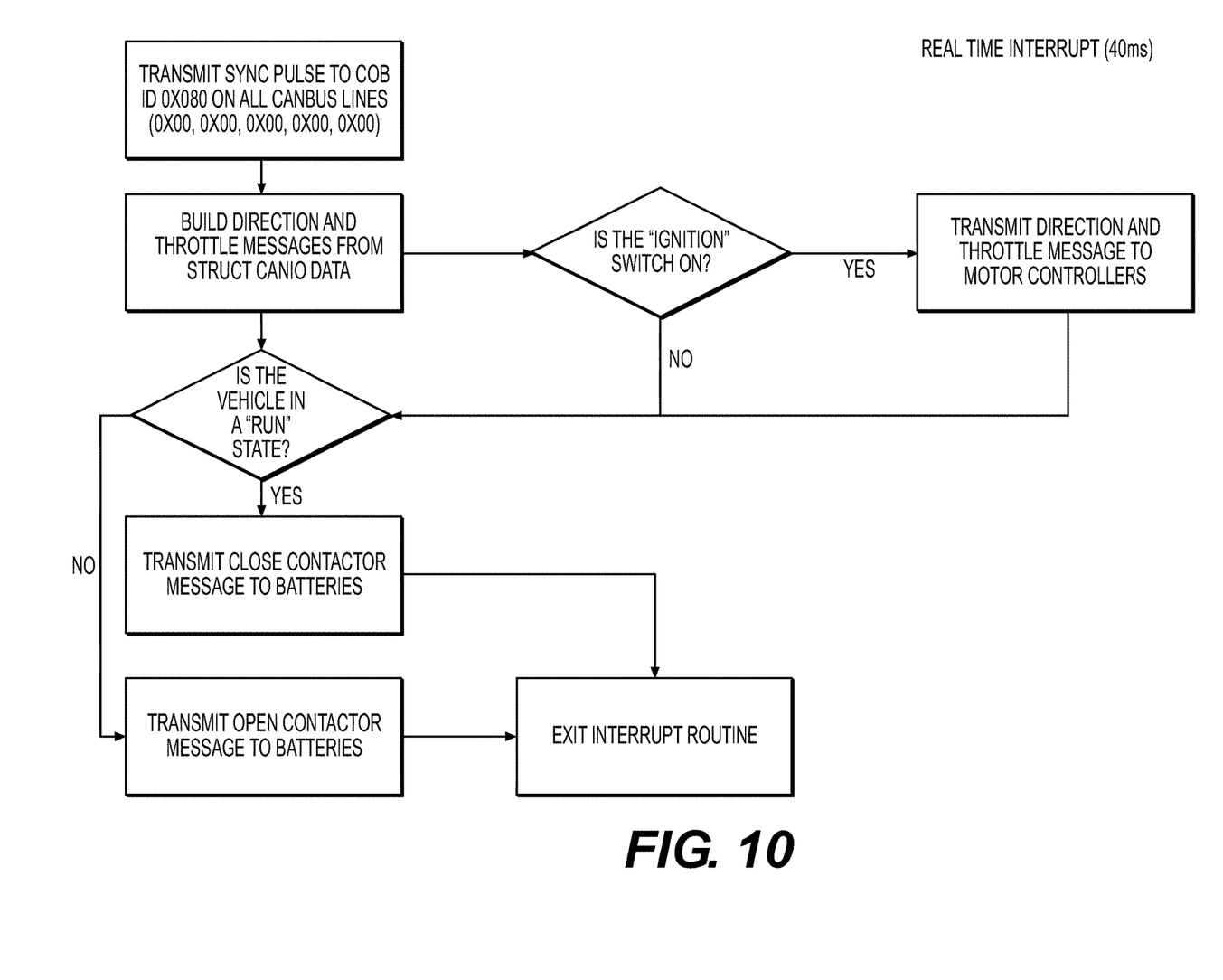
FIG. 10 shows an exemplary Real Time Interrupt block diagram.

FIG. 10 shows an exemplary Real Time Interrupt block diagram that starts every 40 ms. The sync pulse 1101 is sent to trigger systems on the CANBUS to send their data. The propulsion data 1102 is constructed using the stored data parsed from the sub systems CANBUS messages. The ignition switch is on 1107, the throttle message is transmitted to the appropriate motor controllers 1108 and is scaled based on torque biases, traction modes and thermal and/or battery current cutback settings. If the vehicle is in a "run" state 1103, the batteries will close their contactors 1104 or keep them closed if they are already closed to allow power to be provided to the vehicle and the RTI routine will close 1106. If the vehicle is not in a "run" state 1103, the batteries will open their contactors 1105 or will keep them open if they are already open and the RTI routine will close 1106.

Figure 11:
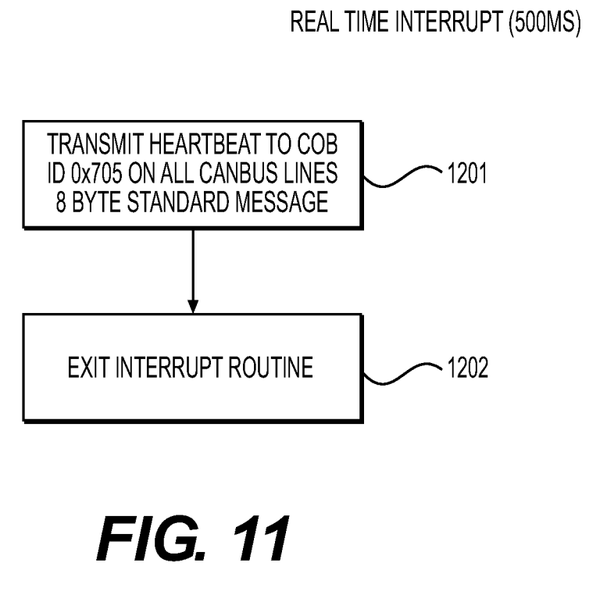
FIG. 11 shows an exemplary Real Time Interrupt block diagram.

FIG. 11 shows an exemplary Real Time Interrupt block diagram that starts every 500 ms. The heartbeat 1201 is sent to indicate the presence of the PCM or BMU on the CANBUS and the state of the PCM or BMU.

Although the invention has been described in detail with reference to certain preferred embodiments, variations and modifications exist within the spirit and scope of the invention as described and defined in the following claims.

The invention claimed is:

1. A vehicle drivetrain comprising:
a first transmission comprising a first input shaft, a second input shaft, a first output shaft, and a second output shaft, wherein the first transmission is configured to replace an original transmission such that the first output shaft is connected to a first wheel assembly and the second output shaft is connected to a second wheel assembly;
an electronic control unit (ECU) configured to execute a plurality of machine instructions comprising:
a first plurality of machine instructions comprising an initialization module that initializes a real time interrupt (RTI) module; and
a second plurality of machine instructions comprising the RTI module, wherein the RTI module is configured to ascertain if the vehicle is in an on or an off position and transmits direction and throttle messages to at least motor controller if the vehicle is in the on position; wherein the RTI module is configured to ascertain if the vehicle is in a run state and transmit close contactor messages to a power source if the vehicle is in the run state and transmit open contactor messages to the power source if the vehicle is not in the run state.

2. The vehicle drivetrain of claim 1, the plurality of machine instructions further comprising:
a third plurality of machine instructions comprising a heartbeat module configured to ascertain if a Powertrain Control Module (PCM) and a Battery Management Unit (BMU) are electrically coupled to the vehicle drivetrain and are operating.

3. The vehicle drivetrain of claim 1, further comprising at least one motor coupled to the first transmission, wherein each motor of the at least one motors comprises at least one motor controller.

4. An electronic control system comprising:
an electronic control unit (ECU) configured to execute a plurality of machine instructions comprising:
a first plurality of machine instructions comprising an initialization module that initializes a real time interrupt (RTI) module; and
a second plurality of machine instructions comprising the RTI module, wherein the RTI module is configured to ascertain if a vehicle is in an on or an off position and transmits direction and throttle messages to at least motor controller if the vehicle is in the on position; wherein the RTI module is configured to ascertain if the vehicle is in a run state and transmit close contactor messages to a power source if the vehicle is in the run state and transmit open contactor messages to the power source if the vehicle is not in the run state.

5. The electronic control system of claim 4, the plurality of machine instructions further comprising:
a third plurality of machine instructions comprising a heartbeat module configured to ascertain if a Powertrain Control Module (PCM) and a Battery Management Unit (BMU) are electrically coupled to the vehicle drivetrain and are operating.

6. An electronic control system comprising:
a Powertrain Control Module (PCM) and a Battery Management Unit (BMU) configured to execute a plurality of machine instructions comprising:
a first plurality of machine instructions comprising an initialization module that initializes a real time interrupt (RTI) module; and
a second plurality of machine instructions comprising the RTI module, wherein the RTI module is configured to ascertain if a vehicle is in an on or an off position and transmits direction and throttle messages through the PCM to at least motor controller if the vehicle is in the on position; wherein the RTI module is configured to ascertain if the vehicle is in a run state and transmit close contactor messages through the BMU to a power source if the vehicle is in the run state and transmit open contactor messages to the power source if the vehicle is not in the run state.

7. The electronic control system of claim 6, the plurality of machine instructions further comprising:
a third plurality of machine instructions comprising a heartbeat module configured to ascertain if the Powertrain Control Module (PCM) and the Battery Management Unit (BMU) are electrically coupled to the electronic control system and are operating.

* * * * *